(12) United States Patent
Abrams

(10) Patent No.: US 8,103,541 B2
(45) Date of Patent: Jan. 24, 2012

(54) DEVICE AND METHOD FOR PRICING REPAIR SERVICES

(75) Inventor: James D. Abrams, Sarasota, FL (US)

(73) Assignee: Clockwork IP, LLC, Sarasota, FL (US)

( * ) Notice: Subject to any disclaimer, the term of this patent is extended or adjusted under 35 U.S.C. 154(b) by 0 days.

(21) Appl. No.: 12/422,727

(22) Filed: Apr. 13, 2009

(65) Prior Publication Data

US 2009/0254493 A1    Oct. 8, 2009

Related U.S. Application Data

(63) Continuation of application No. 10/771,132, filed on Feb. 3, 2004, now abandoned, which is a continuation of application No. 09/597,290, filed on Jun. 20, 2000, now abandoned.

(51) Int. Cl.
*G06Q 10/00* (2012.01)
*G06Q 30/00* (2012.01)
*G06F 17/00* (2006.01)
*G06G 7/00* (2006.01)

(52) U.S. Cl. .................................... 705/7.35; 705/400

(58) Field of Classification Search ............ 705/400, 705/7.35
See application file for complete search history.

(56) References Cited

U.S. PATENT DOCUMENTS

| | | | |
|---|---|---|---|
| 3,709,404 A * | 1/1973 | Dana | ............... 221/120 |
| 4,435,769 A | 3/1984 | Nagano et al. | |
| 5,317,503 A | 5/1994 | Inoue | |
| 5,508,977 A | 4/1996 | Tymn | |
| 5,920,846 A | 7/1999 | Storch et al. | |
| 6,125,354 A | 9/2000 | MacFarlane et al. | |
| 6,219,930 B1 | 4/2001 | Reid | |
| 7,269,569 B2 | 9/2007 | Spira et al. | |

OTHER PUBLICATIONS

Malkin, Richard. "Beating Lower Prices with Better Service" Distribution. v92n10. pp. 68-70. Oct. 1993.*

'Flat Rate Plus 99' Flat Rate Pricing System web page [online]. MrHVAC.com, Mar. 4, 2000 [retrieved on Sep. 26, 2003]. Retrieved from the Internet <URL: web.archive.org/web/20000304112137/>.

'Flat Rate Plu $' Flat Rate Pricing System web pages [online]. MrHVAC.com, circa 1996 [retrieved on Sep. 26, 2003]. Retrieved from the Internet <URL: www.mrhvac.com>.

(Continued)

*Primary Examiner* — John Hayes
*Assistant Examiner* — Allen J Jung
(74) *Attorney, Agent, or Firm* — Quinn Law Group, PLLC

(57) ABSTRACT

A list of pricing information for repair services includes a potentially large number of repair services grouped into a limited number of price categories such that the price of any given pricing category represents the price of each different service included in that category. A method of using this price list to determine the price of a particular repair service desired by a customer includes the steps of identifying in the price list the pricing category which includes the particular service desired, and determining the unique price assigned to that pricing category. Preferably, the price list is initially displayed to a customer before the customer's equipment is diagnosed, and the customer is informed that the cost of the repair service will be one of the prices associated with a listed pricing category. Upon diagnosing the customer's equipment to determine the particular repair service needed, and advising the customer of such, the service technician as well as the customer can each reference the price list independently to readily determine the price of the desired service.

15 Claims, 3 Drawing Sheets

| SERVICE TYPE | INDIVID. PRICE | FREQ (JOBS/UNIT TIME) |
|---|---|---|
| TYPE 1 | $70 | 5 |
| TYPE 2 | $80 | 10 |
| TYPE 3 | $90 | 5 |
| TYPE 4 | $100 | 10 |

WEIGHTED AVG. PRICE = $87

OTHER PUBLICATIONS

International Service Leadership (ISL) Flat Rate Pricing System web page [online]. ISLinc.net [retrieved on Sep. 26, 2003]. Retrieved from the Internet <URL: www.islinc.net>.

Callahan/Roach 'Customer Assurance Pricing' (CAP) Flat Rate Pricing System web pages [online]. Callahan-Roach.com [retrieved on Sep. 26, 2003]. Retrieved from the Internet <URL: www.callahan-roach.com>.

PSI Straight Forward Pricing Booklet (Heating & Air Conditioning Service); 1999.

PSI Straight Forward Pricing Booklet (Installed Product Guide); 1999.

* cited by examiner

STRAIGHT FORWARD REPAIR PRICING GUIDE

A. <u>REPAIR, REPLACE, INSTALL:</u>      $890
IN-WARRANTY CONDENSER COIL, RELOCATE CONDENSING UNIT, FLUE, IN-WARRANTY HEAT EXCHANGER, REVERSING VALVE, SUCTION LINE ACCUMULATOR

B. <u>REPAIR, REPLACE, INSTALL:</u>      $477
FACTORY MOTOR, FACTORY BURNERS, PRIMARY CIRCUIT BOARD, IN-WARRANTY COMPRESSOR, MAJOR DUCT REPAIR, IN-WARRANTY EVAPORATOR COIL, EXPANSION VALVE, REFRIGERANT LEAK SEARCH AND REPAIR, REFRIGERANT RECOVERY AND RE-CHARGE, SUCTION LINE DRYER

C. <u>REPAIR, REPLACE, INSTALL:</u>      $287
BLOWER FAN & PULLEYS, UNIVERSAL BURNERS, SECONDARY CIRCUIT BOARD, UNIVERSAL MOTOR, DEFROST CONTROL BOARD, FURNACE RE-WIRE, GAS VALVE, HEAT STRIP, IGNITER, ELECTRONIC THERMOSTAT

D. <u>REPAIR, REPLACE, INSTALL:</u>      $189
AIR BALANCE, BLOWER FAN, BREAKER, CLEAN COMPLETE A/C, CLEAN COMPLETE FURNACE, CONDENSER FAN BLADE, CONTACTOR, DISCONNECT BOX, DRAIN PAN & LINE, MINOR DUCT REPAIR, FAN & LIMIT SWITCH, FLUE REPAIR, HUMIDISTAT, PRESSURE SWITCH, RELAY, SEQUENCER, SHAFT & BEARINGS, START KIT, TIMER, UV LIGHT, WIRING

E. <u>CLEAN, ADJUST:</u>      $99
BLOWER, BREAKER, DRAIN, DRAIN LINE, HUMIDIFIER, IGNITION COMPONENTS, FILTER, EVAPORATOR COIL, FINS, PILOT, BLOWER, VENT
<u>REPAIR, REPLACE, INSTALL:</u>
AIR FLOW SWITCH, CAPACITOR, DRAIN LINE, FILTER MEDIA CARTRIDGE, FLAME SENSOR, GLOW COIL, HUMIDIFIER PAD, PILOT, THERMOCOUPLE, STANDARD THERMOSTAT, TRANSFORMER

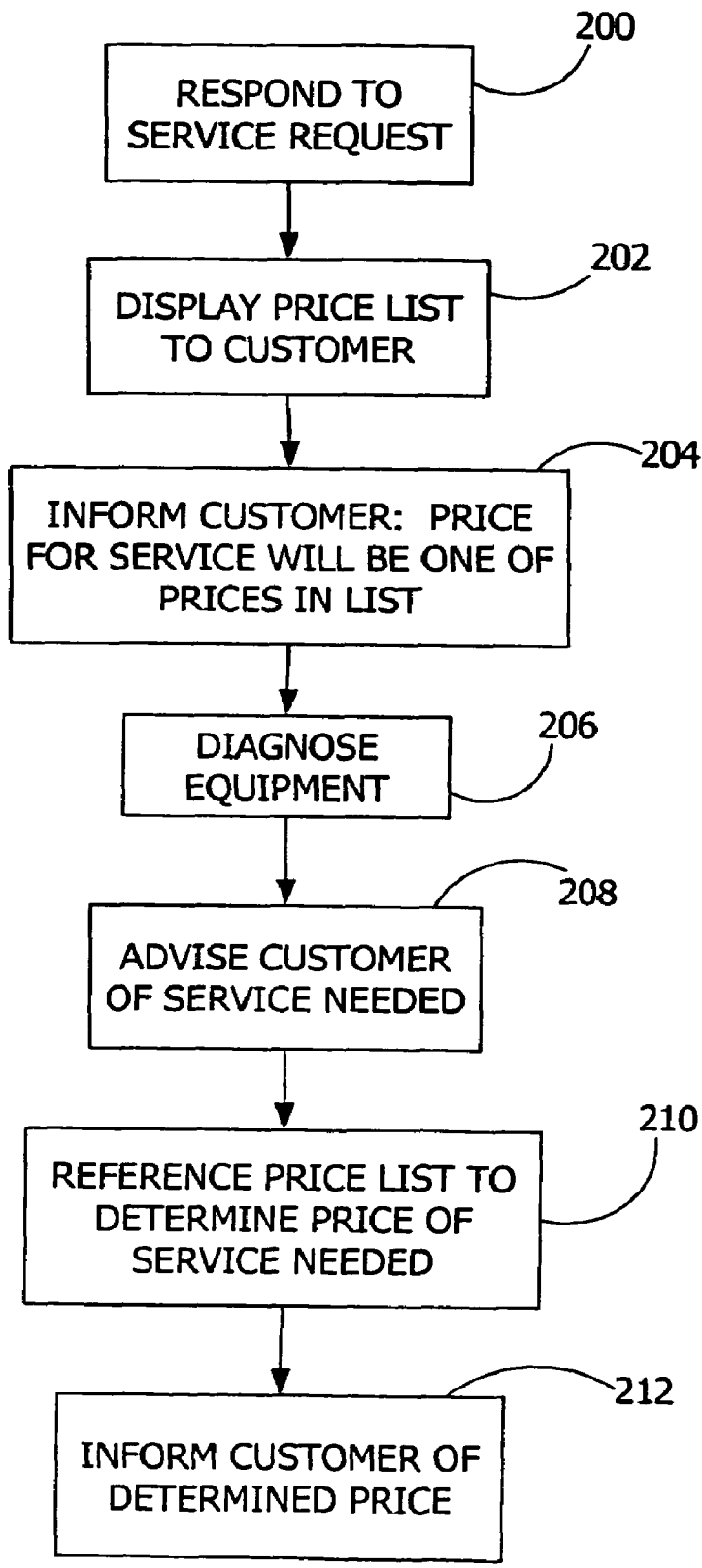

FIG. 3

| SERVICE TYPE | INDIVID. PRICE | |
|---|---|---|
| TYPE 1 | $70 | ⎫ |
| TYPE 2 | $80 | ⎬ CATEGORY F |
| TYPE 3 | $90 | ⎬ $85 |
| TYPE 4 | $100 | ⎭ |
| TYPE 5 | $140 | |
| TYPE 6 | $180 | |
| • | • | |
| • | • | |
| • | • | |
| TYPE N | $ X | |

FIG. 4

| SERVICE TYPE | INDIVID. PRICE | FREQ (JOBS/UNIT TIME) |
|---|---|---|
| TYPE 1 | $70 | 5 |
| TYPE 2 | $80 | 10 |
| TYPE 3 | $90 | 5 |
| TYPE 4 | $100 | 10 |
| WEIGHTED AVG. PRICE = $87 | | |

DEVICE AND METHOD FOR PRICING REPAIR SERVICES

CROSS-REFERENCE TO RELATED APPLICATIONS

This application is a continuation of U.S. application Ser. No. 10/771,132 filed Feb. 3, 2004, now abandoned, which was a continuation of U.S. application Ser. No. 09/597,290 filed on Jun. 20, 2000, now abandoned, the entire disclosures of which are incorporated herein by reference.

FIELD OF THE INVENTION

The present invention relates generally to a device and method for pricing repair services and, more particularly, to a price list in which a potentially large number of repair services are grouped into a limited number of price categories, and to methods of using such a price list in bidding and communicating pricing information to customers.

BACKGROUND OF THE INVENTION

A wide variety of repair services are rendered to customers on an as-needed basis, including repair services of the type which are commonly rendered at a customer's place of residence. Some examples of these services include those routinely performed by plumbers, electricians, HVAC technicians, appliance repair technicians, etc. When determining the price to charge for these services, providers typically employ either one of the following two approaches: a time and materials approach; or a flat rate approach.

According to the time and materials approach to pricing repair services, a service technician must keep track of the amount of time spent on a particular job, which is normally charged to the customer at an hourly rate, taking into account the starting and stopping times of each technician on the job, including perhaps for lunch and other breaks. The service technician must also track the cost of all parts, equipment and other materials which are used in rendering the service (for purposes herein, replacement parts and/or new equipment installation may be considered part of a "service," when applicable). Thus, in addition to tracking the materials used, the technician must also determine the cost of these materials, typically by referencing a detailed parts catalog. Not only is this a time consuming process, and requires each technician in the field to be equipped with one or more parts catalogs which can be expensive and cumbersome to use, it also frequently results in errors in the calculated price to the disadvantage of the customer or the service provider, or both where such errors result in a dissatisfied customer. Further, the time and materials approach to pricing repair services does not readily lend itself to providing customers with accurate upfront price quotes, as the amount of time required to perform the necessary repairs may be generally unknown until the job is nearly completed. This approach also has a tendency of creating apprehension on the part of many customers as the amount of time spent on the job by the technician increases, with a corresponding increase in the ultimate price for the service.

According to the flat rate approach to pricing repair services, once the particular repair service desired by a customer is known (which is typically determined by the service technician upon diagnosing the equipment in need of repair), the technician can determine a flat rate price for the needed service. This is accomplished by referencing a comprehensive pricing catalog which includes "installed prices" for a wide variety of parts and equipment. For example, such a pricing catalog may specify the installed price of a specific gas control valve for an HVAC system at $200, which represents the costs of the valve itself as well as the cost to install it. However, because these catalogs typically contain pricing information for numerous gas control valves, in addition to a wide variety of other parts and equipment, it is not uncommon for service technicians to make mistakes when trying to price a particular repair service. Further, the pricing catalogs themselves are typically quite expensive, and a separate catalog must typically be purchased for each field technician of a service organization on an annual or biannual basis, or whenever the catalogs are updated to reflect new parts, services and price changes.

In addition to the shortcomings noted above for each approach, the average customer is generally unable to opportunity independently confirm the accuracy of a price quoted for a particular repair service, as the customer usually does not have access to the necessary pricing catalogs and would probably be incapable of using such catalogs even if faced with the quoted by service technicians as suspect, and question at least to themselves whether the quoted price is fair or accurate.

SUMMARY OF THE INVENTION

Consequently, some customers may regard the prices in order to solve these and other needs in the art, the inventor hereof has succeeded at designing and developing an improved approach to pricing repair services which minimizes the need for expensive pricing catalogs, minimizes the amount of time required by service technicians in bidding on repair services, minimizes the risk of errors in the bidding process and, significantly, enables customers to receive up front pricing information, the accuracy of which can be readily and independently confirmed by the customer. To this end, a list of pricing information is provided in which a potentially large number of repair services are grouped into a limited number of price categories such that the price of any given service category represents the price of each different service included in that category. Thus, to determine the price of a repair service desired by a customer, a service technician need only identify the service category which includes the desired repair service, and then reference the price assigned to that particular service category. Preferably, the price list is initially provided to the customer before the customer's equipment is diagnosed, and the customer is informed that the cost of the repair service will be one of the prices associated with a listed service category. Upon diagnosing the customer's equipment to determine the particular repair service desired, and advising the customer of such, the service technician as well as the customer can each reference the 35 price list to determine the price associated with the desired service. Due to the simplified format of the price list, and the ability of both the service technician and the customer to determine the price of a desired service therefrom, the risk of errors in using the price list is virtually non-existent. This approach to pricing repair services also contributes to customer confidence in the service provider, as the customer preferably receives up front and straightforward pricing information, and is therefore less likely to expect errors or foul play in the quoted price, and should also be less concerned with the amount of time required for the technician to perform the desired service since this will not affect the price charged to the customer. This inventive approach to pricing repair services can also facilitate comparison shopping, which is advantageous for the customer and thus may further contribute to the commercial success of the invention.

In accordance with one aspect of the present invention, a method of determining pricing information corresponding to a service desired by a customer comprises the steps of referencing a price list having a plurality of service categories, where each service category has a different price associated therewith and at least one of the service categories includes a plurality of different services, identifying in the price list the service category which includes the desired service, and identifying in the price list the unique price associated with the identified service category, wherein the identified price represents the price of the desired service. In accordance with another aspect of the present invention, a method of communicating to a customer pricing information corresponding to a service desired by the customer comprises the steps of displaying to the customer a price list having a plurality of service categories, where each service category has a unique price associated therewith and at least one of the service categories includes a plurality of different services, thereby enabling the customer to determine the price of the desired service by identifying in the price list the unique price associated with the service category which includes the desired service. In accordance with a further aspect of the present invention, a method of pricing a plurality of different services, any one of which may be needed by a customer, comprises the steps of grouping the different services into a plurality of service categories, and assigning a unique price to each of the service categories whereby the unique price assigned to a particular one of the service categories represents the price of each different service grouped into that particular one service category.

In accordance with still another aspect of the present invention, a list of pricing information for a plurality of different services, any one of which services may be needed by a customer, includes a plurality of service categories, where each service category has a unique price associated therewith and at least one the service categories includes a plurality of different services, and where the price of a particular service included in the list is the unique price associated with the service category which includes that particular service.

While some of the principal features and advantages of the present invention have been described above, a greater and more thorough understanding of the invention may be attained by referring to the drawings and the detailed description of preferred embodiments which follow.

BRIEF DESCRIPTION OF THE DRAWINGS

FIG. 1 is an exemplary price list according to one 30 embodiment of the present invention.

FIG. 2 is a flow chart of a preferred method for communicating pricing information to customers using the price list of FIG. 1.

FIG. 3 illustrates a preferred approach to grouping different services into the same service category, and to assigning a unique price to that service category.

FIG. 4 illustrates an alternative approach to assigning unique prices to service categories with consideration of the frequency at which the different services in each category are rendered.

DETAILED DESCRIPTION OF PREFERRED EMBODIMENTS

An exemplary price list according to one preferred embodiment of the present invention is illustrated in FIG. 1 and is referred to generally by reference character 100. Although this particular price list 100 includes sample pricing information specific to residential HVAC services, it should be understood that the teachings of the present invention are applicable to a wide variety of services, as will be apparent. The price list 100 includes several service categories A, B, C, D and E, and each of these service categories preferably includes several different service types. In this particular example, category A includes services relating to the repair, replacement and/or installation of, among other things, a condenser coil still covered under factory warranty, category B includes services relating to the repair, replacement and/or installation of, among other things, factory burners, and category E includes services relating to, among other things, the cleaning and/or adjustment of blowers, breakers, drains, etc. As shown in FIG. 1, a different or unique price is associated with each different service category. Specifically, category A is priced at $890, category B is priced at $477, category C is priced at $287, category D is priced at $189, and category E is priced at $99. The price associated with a particular service category represents the price of each different service included in that particular service category. In other words, the different services in any given service category are all priced the same. Thus, a Customer in need of a blower adjustment will pay the same as a customer requiring a humidifier cleaning, because both of these services are grouped in the same category, namely, category E. Further, both customers would be charged, in this example, $99, as this is the price associated with category E. As shown in FIG. 1, the price list 100 preferably comprises only a single page. Although, according to the present invention, a variety of services may be offered at the same price even though such services were previously offered at different prices, the grouping of the services into service categories and the assigning of uniform prices thereto can be performed in such a manner as to yield approximately the same overall revenue for the service provider, if desired, as further explained below.

A preferred method of using the price list 100 shown in FIG. 1 to communicate pricing information to customers will now be described with reference to the flow chart of FIG. 2. This method preferably begins at step 200 when a service provider responds to a request for service by a customer. In this particular example, the different services included in the price list 100 relate to HVAC services of the type commonly rendered at a customer's place of residence. Thus, the service provider preferably responds to the customer request for service by dispatching a field technician to the customer residence. Alternatively, if the equipment in need of service is capable of being transported, it can be delivered to the service provider's facility for repair. At step 202, the price list 100 is displayed to the customer. In one preferred embodiment, this step includes providing the customer with a hard copy of the price list. Alternatively, the price list can be stored in a computer of the service provider and transmitted to a computer of the customer at an appropriate time. Regardless of how the price list is provided to the customer for review, it may be so provided before the field technician arrives at the customer residence or before equipment of the customer is delivered to a service provider facility for repair.

At step 204, the customer is preferably informed that the price of the service desired is one of the prices set forth in the price list 100. Thus, for the particular price list 100 shown in FIG. 1, the customer would be informed that the cost of the service desired will be $890, $477, $287, $189 or $99. The service technician would then proceed to diagnose the equipment of the customer to determine the specific service desired by the customer.

Thus, although the general nature of the service desired by the customer may be known at the outset (e.g., "fix my furnace"), the particular service desired (e.g., replace the factory burners) may be unknown until the equipment is diagnosed. Preferably, the customer is advised of the results of the diagnosis (i.e., the particular service desired is identified for the customer) at step 208. At step 210, the service technician as well as the customer/if desired, can reference the price list 100 to determine the price of the desired service. More specifically, the technician would first identify in the price list 100 the service category which includes the desired service. For example, if the desired service is to replace factory burners, the technician would first determine that this service is included in category B of the price list 100. The technician would then identify the unique price associated with that category B which, in this example, is $477. Thus, the price to replace the factory burners in this example would be $477. At step 212, the customer is preferably informed of the price for the desired service and can then, if desired, independently reference the price list 100 to confirm the accuracy of the quoted price.

A preferred method for pricing a plurality of different services in accordance with the present invention will now be described with reference to FIGS. 3 and 4. As shown in FIG. 3, a plurality of different service types 1-N are preferably arranged in ascending order according to the individual prices at which such services were previously offered. These services can then be grouped into one or more service categories according to natural price breaks or as otherwise desired. For example, in FIG. 3, service types 5 1, 2, 3, 4 each fall within the range of $70 to $100; and are each grouped into a category F. A unique price can then be assigned to category F, preferably as a function of the average of the individual prices for service types 1-4 which, in this particular example, is $85. In this manner, a service provider can implement the teachings of the present invention without substantially affecting overall gross revenues. In the event that certain services are rendered more frequently than others, then a weighted average can be taken of the individual prices. An example of this is shown in FIG. 4, where service types 2 and 4 are rendered twice as frequently as service types 1 and 3. Thus, in an effort to hold gross revenues constant, a weighted average price of $87 can be used as the unique price for category F, rather than the simple average price of $85 shown in FIG. 3.

Although the present invention has been described with reference to specific embodiments for residential HVAC repair services, it should be understood that the teachings of the invention are not so limited, and can be applied to a wide variety of other repair services including plumbing, electrical, appliance repair, and automotive repair services, regardless of whether such services are rendered at a customer residence or at a service provider facility. The teachings of the present invention can also be extended 30 to services other than repair services.

An important aspect of the present invention is the elegantly simply format of the price list used both by service providers and their customers. For this reason, the number of service categories in any given price list must be limited, taking into account the variety of services and the individual prices of such services to be included in the price list. In the inventor's most preferred embodiments, the total number of service categories in any given price list is limited to no more than twenty-five. Preferably, however, the number of service categories is limited to no more than eight for price lists directed to residential plumbing services, and to no more than five for price lists directed to residential HVAC services. There are various changes and modifications which may be made to the invention, as recognized by those skilled in the art. However, these changes and modifications are suggested by the disclosure. The invention should therefore be limited only, by the scope of the claims appended hereto, and their full range of legal equivalents.

What is claimed is:

1. A method of communicating to a customer pricing information corresponding to a desired service, the method comprising:

receiving information relating to a plurality of services, said information including an individual price and an expected frequency of performance for each of the services;

grouping the services into a plurality of pricing categories fewer in number than the plurality of services, at least one of said pricing categories including at least two unrelated services, and at least one of said pricing categories including at least two services for which the individual prices are different;

determining, for each of the pricing categories, a unique price for any of the services in the respective pricing category as a function of the individual prices and the frequencies of performance for the services in the respective pricing category;

generating, by a computer processor, a price list, said price list including each of the pricing categories and the determined unique prices for the pricing categories, the unique price associated with a particular pricing category representing the price of each service included in that particular pricing category; and displaying to the customer the price list, thereby enabling the customer to determine the price to be charged to the customer for the desired service by identifying in the price list the unique price associated with the pricing category which includes the desired service;

wherein the price list is displayed to the customer before determining which of the plurality of services is the desired service.

2. The method of claim 1 wherein each pricing category includes a plurality of unrelated services.

3. The method of claim 1 wherein the plurality of services is a large number of services and wherein the plurality of pricing categories is no more than twenty five.

4. The method of claim 1 wherein the plurality of services is a large number of services and wherein the plurality of pricing categories is no more than eight.

5. The method of claim 1 wherein the plurality of services is a large number of services and wherein the plurality of pricing categories is no more than five.

6. The method of claim 1 wherein displaying includes displaying the price list to the customer at a location of the customer.

7. The method of claim 1, further comprising diagnosing an equipment of the customer to determine which of the plurality of services is the service desired.

8. The method of claim 7, further comprising informing the customer before the equipment is diagnosed that the price for the desired service will be one of said unique prices.

9. The method of claim 7, further comprising advising the customer which of the plurality of services is the desired service after diagnosing the equipment.

10. The method of claim 7 wherein the equipment is selected from the group consisting of HVAC, plumbing, electrical and appliance equipment and diagnosing includes diagnosing the equipment at a location of the customer.

11. The method of claim 7 wherein the equipment is selected from the group consisting of automotive and appliance equipment and diagnosing includes diagnosing the equipment at a service provider facility.

12. The method of claim 1 wherein displaying includes providing the customer with a copy of the price list.

13. The method of claim 1, further comprising storing the generated price list in a first computer; and
wherein displaying to the customer the price list includes transmitting the stored price list from the first computer to a second computer, the second computer being a computer of the customer.

14. A method of pricing a plurality of different services offered by a service provider, anyone of which may be needed by a customer, the method comprising:
grouping the different services into a limited set of pricing categories as a function of a cost of each service and an expected frequency at which each service is rendered, at least one of said pricing categories including at least two unrelated different services;
determining a unique price for each of the pricing categories as a function of the cost and the expected frequency for each of the services in the respective pricing category;
assigning the unique prices to the pricing categories whereby the unique price assigned to a particular one of the pricing categories represents the price of each service grouped into that particular one pricing category;
generating, by a computer processor, a price list, said price list including each of the pricing categories and the assigned unique prices for the pricing categories; and
displaying the price list to the customer.

15. The method of claim 14, further comprising storing the generated price list in a computer of the service provider; and
wherein displaying the price list to the customer includes transmitting the stored price list to a computer of the customer.

* * * * *